US012634854B2

(12) United States Patent
Tang

(10) Patent No.: US 12,634,854 B2
(45) Date of Patent: *May 19, 2026

(54) SIGNAL TRANSMISSION METHOD AND APPARATUS AND COMPUTER STORAGE MEDIUM

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 424 days.

This patent is subject to a terminal disclaimer.

(21) Appl. No.: 18/348,458

(22) Filed: Jul. 7, 2023

(65) Prior Publication Data

US 2023/0354231 A1     Nov. 2, 2023

Related U.S. Application Data

(63) Continuation of application No. 16/919,803, filed on Jul. 2, 2020, now Pat. No. 11,758,495, which is a
(Continued)

(51) Int. Cl.
*H04W 56/00* (2009.01)
*H04W 16/14* (2009.01)
*H04W 48/08* (2009.01)

(52) U.S. Cl.
CPC ....... *H04W 56/0015* (2013.01); *H04W 16/14* (2013.01); *H04W 48/08* (2013.01)

(58) Field of Classification Search
CPC ............. H04W 56/0015; H04W 16/14; H04W 48/08; H04W 56/001; H04W 48/10;
(Continued)

(56) References Cited

U.S. PATENT DOCUMENTS

2017/0094621 A1 * 3/2017 Xu ........................ H04L 5/0048

FOREIGN PATENT DOCUMENTS

| CN | 105745980 A | 7/2016 |
| CN | 106452704 A | 2/2017 |
| CN | 106793058 A | 5/2017 |
| CN | 107124383 A | 9/2017 |
(Continued)

OTHER PUBLICATIONS

International Search Report(ISR) dated Sep. 13, 2018 for Application No. PCT/CN2018/070068.
(Continued)

*Primary Examiner* — Ayanah S George
(74) *Attorney, Agent, or Firm* — Ladas & Parry LLP

(57) ABSTRACT

The present disclosure discloses a signal transmission method and apparatus, and a computer storage medium. The method includes: a terminal device determines a synchronization signal transmission mode on a first carrier, where the synchronization signal transmission mode is a first transmission mode or a second transmission mode; and the terminal device receives information on the first carrier according to the synchronization signal transmission mode. A network device determines a synchronization signal transmission mode on a first carrier, where the synchronization signal transmission mode is a first transmission mode or a second transmission mode; and the network device sends information to a terminal device on the first carrier according to the synchronization signal transmission mode.

17 Claims, 3 Drawing Sheets

A terminal device determines a synchronization signal transmission mode on a first carrier, where the synchronization signal transmission mode is a first transmission mode or a second transmission mode    301

The terminal device receives information on the first carrier according to the synchronization signal transmission mode    302

Related U.S. Application Data continuation of application No. PCT/CN2018/070068, filed on Jan. 2, 2018.

(58) Field of Classification Search
CPC .... H04W 56/00; H04L 27/0006; H04L 5/001; H04L 5/004; H04L 5/0053; H04J 11/0069
See application file for complete search history.

(56) References Cited

FOREIGN PATENT DOCUMENTS

| | | | |
|---|---|---|---|
| CN | 107148789 | A | 9/2017 |
| CN | 107528682 | A | 12/2017 |
| EP | 2360976 | A1 | 8/2011 |
| EP | 3018938 | A1 | 5/2016 |
| JP | 2017525317 | A | 8/2017 |
| WO | 2016147994 | A1 | 9/2016 |
| WO | 2016203290 | A1 | 12/2016 |
| WO | 2017053024 | A1 | 3/2017 |
| WO | 2017210319 | A1 | 12/2017 |

OTHER PUBLICATIONS

Qualcomm Incorporated, 3GPP TSG RAN Meeting #77 RP-172021; Revised SID on NR-based Access to Unlicensed Spectrum, Sapporo, Japan, Sep. 11-14, 2017, 5 pages.

The EESR of corresponding European application No. 18898803.4, dated Dec. 21, 2020.

The first Office Action of corresponding Indian application No. 202017032930, dated Sep. 22, 2021.

The first Office Action of corresponding Korean application No. 10-2020-7022282, dated Dec. 10, 2021.

The first Office Action of corresponding Japanese application No. 2020-536994, dated Jan. 6, 2022.

The first Office Action of corresponding Chinese application No. 202110185052.0, dated Aug. 31, 2022.

The fourth Office Action of corresponding European application No. 18898803.4, dated Jul. 20, 2022.

The Notice of Allowance of corresponding Chinese application No. 202110185052.0, dated Dec. 2, 2022.

The fifth Office Action of corresponding European application No. 18898803.4, dated Jan. 16, 2023.

The Hearing Notice of corresponding Indian application No. 202017032930, dated Dec. 12, 2023.

The EESR of corresponding European application No. 23210437.2, dated Feb. 8, 2024.

The first Office Action of corresponding Australian application No. 2018400261, dated Jul. 3, 2023.

Intel Corporation, Details on small cell discovery signal, R1-142028, 3GPP TSG-RAN WG1 #77, Seoul, Korea, May 19-23, 2014.

The first Office Action of corresponding Chinese application No. 201880085080.1, dated Aug. 28, 2024.

* cited by examiner

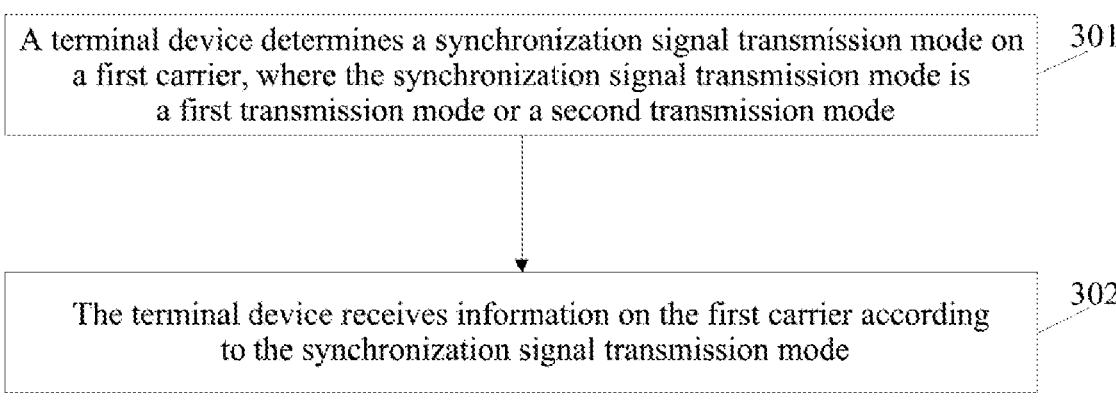

A terminal device determines a synchronization signal transmission mode on a first carrier, where the synchronization signal transmission mode is a first transmission mode or a second transmission mode    301

The terminal device receives information on the first carrier according to the synchronization signal transmission mode    302

FIG. 3

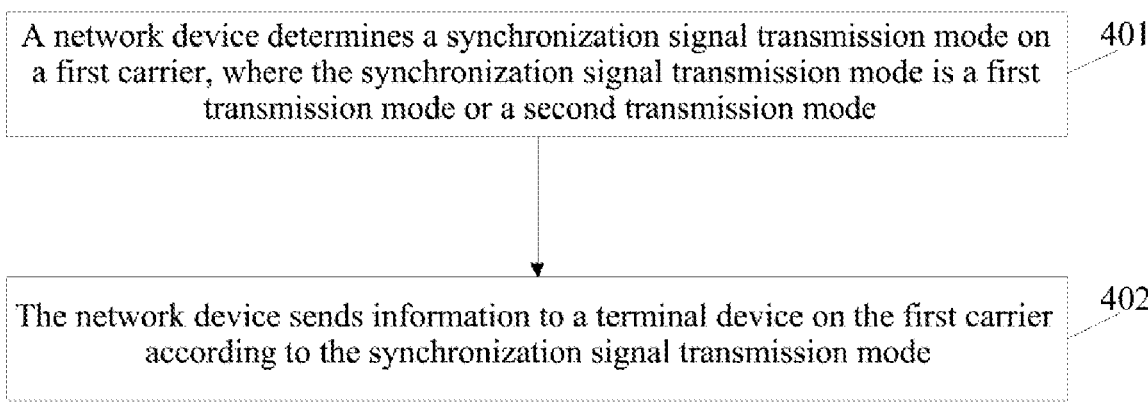

A network device determines a synchronization signal transmission mode on a first carrier, where the synchronization signal transmission mode is a first transmission mode or a second transmission mode    401

The network device sends information to a terminal device on the first carrier according to the synchronization signal transmission mode    402

FIG. 4

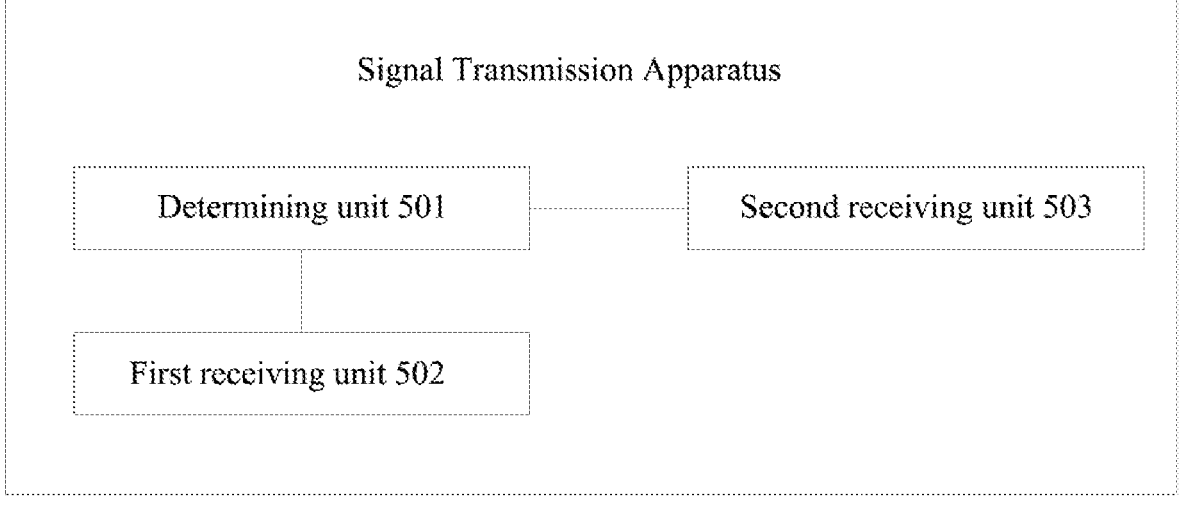

Signal Transmission Apparatus

Determining unit 501

Second receiving unit 503

First receiving unit 502

FIG. 5

SIGNAL TRANSMISSION METHOD AND APPARATUS AND COMPUTER STORAGE MEDIUM

CROSS-REFERENCE TO RELATED APPLICATIONS

This application is a continuation of U.S. patent application Ser. No. 16/919,803, filed on Jul. 2, 2020, which is a continuation of the International Application No. PCT/CN2018/070068, filed on Jan. 2, 2018. The contents of the above applications are incorporated herein by reference in their entireties.

TECHNICAL FIELD

The present disclosure relates to the field of wireless communication technologies, and in particular, to a signal transmission method and apparatus, and a computer storage medium.

BACKGROUND

With the development of wireless communication technology, a licensed-assisted access system based on a long term evolution (LTE) system (LAA-LTE) provides services to a terminal device based on a carrier aggregation structure by using a carrier on a licensed spectrum as a primary carrier and using a carrier on an unlicensed spectrum as a secondary carrier. In the LAA-LTE system, the primary carrier can be used to ensure initial access of the terminal device and transmission performances of some key services, while the secondary carrier on the unlicensed spectrum can be used to perform transmission of non-critical big data services for the terminal device, thereby achieving a purpose of balancing loads of an LTE cell.

During downlink signal transmission in the LAA-LTE system, a network device needs to send a discovery reference signal (DRS) on an unlicensed carrier, so that a terminal device in this cell can accomplish synchronization with a cell on the unlicensed carrier, and a terminal device of a neighboring cell can accomplish radio resource management (RRM) measurement of signals of this cell. The DRS in the LTE system includes a primary synchronization signal (PSS), a secondary synchronization signal (SSS), and a cell-specific reference signal (CRS). In an embodiment, the DRS may also include a channel-state information reference signal (CSI-RS).

As shown in FIG. 1, taking the DRS including PSS, SSS, and CRS as an example, transmission of the DRS in the LAA-LTE system will be illustrated. A network device detects and obtains a right to use a channel in the unlicensed spectrum by a listen before talk (LBT) principle, then the network device can send a DRS within a discovery signals measurement timing configuration (DMTC) window that the network device configures for a terminal device. If the DRS is transmitted together with channels such as physical downlink shared channel (PDSCH)/physical downlink control channel (PDCCH)/enhanced physical downlink control channel (EPDCCH), it can only be transmitted in subframe 0 (shown as #0 in FIG. 1) or subframe 5 (shown as #5 in FIG. 1). If the DRS is transmitted separately, that is the DRS is not transmitted together with channels such as PDSCH/PDCCH/EPDCCH, a DRS signal can be sent in a first LBT successful subframe in the DMTC window. When the DRS is transmitted in a subframe, first 12 symbols of the subframe are occupied, as shown in FIG. 1, the PSS and the SSS occupy symbol 5 and symbol 6, and the CRS occupies symbol 0, symbol 4, symbol 7, and symbol 11.

When new radio (NR) technology is applied to the unlicensed spectrum, there may be a plurality of network deployment manners, such as carrier aggregation (CA) network deployment, dual connectivity (DC) network deployment or standalone (SA) network deployment. Since the LTE-LAA system only supports the CA network deployment, the existing DRS transmission manner on the LAA-LTE system cannot meet demands when applied to the above NR system-based network deployment manners.

SUMMARY

To solve the above technical problems, embodiments of the present disclosure provide a signal transmission method and apparatus, and a computer storage medium.

A signal transmission method provided by an embodiment of the present disclosure includes:

determining, by a terminal device, a synchronization signal transmission mode on a first carrier, where the synchronization signal transmission mode is a first transmission mode or a second transmission mode; and receiving, by the terminal device, information on the first carrier according to the synchronization signal transmission mode.

In an implementation, the determining, by a terminal device, a synchronization signal transmission mode on a first carrier, includes:

receiving, by the terminal device on a second carrier, first indication information sent by a network device, where the first indication information is used to determine that the synchronization signal transmission mode on the first carrier is the first transmission mode or the second transmission mode; and determining, by the terminal device, the synchronization signal transmission mode on the first carrier according to the first indication information.

In an implementation, the determining, by a terminal device, a synchronization signal transmission mode on a first carrier, includes:

determining, by the terminal device, that the synchronization signal transmission mode on the first carrier is the first transmission mode when the terminal device has not received first indication information sent by a network device on a second carrier.

In an implementation, the determining, by a terminal device, a synchronization signal transmission mode on a first carrier, further includes:

determining, by the terminal device, that the synchronization signal transmission mode on the first carrier is the first transmission mode when the terminal device accesses a network through the first carrier.

In an implementation, when the synchronization signal transmission mode is the first transmission mode, then the receiving, by the terminal device, information on the first carrier according to the synchronization signal transmission mode, includes:

receiving, by the terminal device, a first synchronization signal block (SSB) on the first carrier, where the first SSB includes a primary synchronization signal, a secondary synchronization signal, and a first physical broadcast channel (PBCH).

In an implementation, the first PBCH includes master information block (MIB) information for initial access of the terminal device.

In an implementation, when the synchronization signal transmission mode is the second transmission mode, then the receiving, by the terminal device, information on the first carrier according to the synchronization signal transmission mode, includes:

receiving, by the terminal device, a second SSB on the first carrier, where the second SSB includes a primary synchronization signal, a secondary synchronization signal, and a second PBCH.

In an implementation, there is at least one piece of different information between information transmitted by the second PBCH and information transmitted by the first PBCH.

In an implementation, the second PBCH includes at least one of the following information: a cell identifier, a beamforming identifier used by a synchronization signal, transmission power of the synchronization signal, resource allocation of grant-free uplink transmission, a carrier sensing mode used by the grant-free uplink transmission, a power threshold used by the network device for performing carrier sensing.

In an implementation, when the synchronization signal transmission mode is the second transmission mode, then the receiving, by the terminal device, information on the first carrier according to the synchronization signal transmission mode, includes:

receiving, by the terminal device, a synchronization signal (SS) on the first carrier, where the SS includes: a primary synchronization signal and a secondary synchronization signal.

In an implementation, a transmission resource corresponding to a first PBCH or a second PBCH on the first carrier is used to transmit a downlink data channel or a downlink control channel; or, the transmission resource corresponding to the first PBCH or the second PBCH on the first carrier is used to transmit a filling signal; or the transmission resource corresponding to the first PBCH or the second PBCH on the first carrier does not send information.

In an implementation, a communication network where when the terminal device is located is in a CA network deployment, then the synchronization signal transmission mode on the first carrier is the second transmission mode;

when the communication network where the terminal device is located is not in the CA network deployment, then the synchronization signal transmission mode on the first carrier is the first transmission mode.

In an implementation, a frequency domain resource on the first carrier is a frequency domain resource shared by at least two communication devices including the network device, and a frequency domain resource on the second carrier is a frequency domain resource dedicated to the network device.

In an implementation, the frequency domain resource on the first carrier is an unlicensed frequency domain resource, and the frequency domain resource on the second carrier is a licensed frequency domain resource.

A signal transmission method provided by an embodiment of the present disclosure includes:

determining, by a network device, a synchronization signal transmission mode on a first carrier, where the synchronization signal transmission mode is a first transmission mode or a second transmission mode; and sending, by the network device, information to a terminal device on the first carrier according to the synchronization signal transmission mode.

In an implementation, the method further includes:

sending, by the network device, first indication information to the terminal device on a second carrier, where the first indication information is used to determine that the synchronization signal transmission mode on the first carrier is the first transmission mode or the second transmission mode.

In an implementation, when the synchronization signal transmission mode is the first transmission mode, then the sending, by the network device, information to a terminal device on the first carrier according to the synchronization signal transmission mode, includes:

sending, by the network device, a first SSB on the first carrier, where the first SSB includes a primary synchronization signal, a secondary synchronization signal, and a first PBCH.

In an implementation, when the synchronization signal transmission mode is the second transmission mode, then the sending, by the network device, information to a terminal device on the first carrier according to the synchronization signal transmission mode, includes:

sending, by the network device, a second SSB on the first carrier, where the second SSB includes a primary synchronization signal, a secondary synchronization signal, and a second PBCH.

In an implementation, the second PBCH includes at least one of the following information: a cell identifier, a beamforming identifier used by a synchronization signal, transmission power of the synchronization signal, resource allocation of grant-free uplink transmission, a carrier sensing mode used by the grant-free uplink transmission, and a power threshold used by the network device for performing carrier sensing.

In an implementation, when the synchronization signal transmission mode is the second transmission mode, then the sending, by the network device, information to a terminal device on the first carrier according to the synchronization signal transmission mode, includes:

sending, by the network device, an SS on the first carrier, where the SS includes a primary synchronization signal and a secondary synchronization signal.

In an implementation, a transmission resource corresponding to a first PBCH or a second PBCH on the first carrier is used to transmit a downlink data channel or a downlink control channel; or, the transmission resource corresponding to the first PBCH or the second PBCH on the first carrier is used to transmit a filling signal; or the transmission resource corresponding to the first PBCH or the second PBCH on the first carrier does not send information.

In an implementation, the determining, by a network device, a synchronization signal transmission mode on a first carrier, includes:

when a communication network where the network device is located is in a CA network deployment, then the network device determines that the synchronization signal transmission mode on the first carrier is the second transmission mode;

when the communication network where the network device is located is not in the CA network deployment, then the network device determines that the synchronization signal transmission mode on the first carrier is the first transmission mode.

In an implementation, a frequency domain resource on the first carrier includes a frequency domain resource shared by at least two communication devices including the network device, and a frequency domain resource on the second carrier is a frequency domain resource dedicated to the network device.

In an implementation, the frequency domain resource on the first carrier is an unlicensed frequency domain resource, and the frequency domain resource on the second carrier is a licensed frequency domain resource.

A signal transmission apparatus provided by an embodiment of the present disclosure is applied in a terminal device, and the apparatus includes:

a determining unit, configured to determine a synchronization signal transmission mode on a first carrier, where the synchronization signal transmission mode is a first transmission mode or a second transmission mode; and a first receiving unit, configured to receive information on the first carrier according to the synchronization signal transmission mode.

In an implementation, the apparatus further includes:

a second receiving unit, configured to receive first indication information sent by a network device on a second carrier, where the first indication information is used to determine that the synchronization signal transmission mode on the first carrier is the first transmission mode or the second transmission mode; and the determining unit is configured to determine the synchronization signal transmission mode on the first carrier according to the first indication information.

In an implementation, when the second receiving unit not received the first indication information sent by a network device on the second carrier, the determining unit is configured to determine that the synchronization signal transmission mode on the first carrier is the first transmission mode.

In an implementation, when the synchronization signal transmission mode is the first transmission mode, the first receiving unit is configured to receive a first SSB on the first carrier, where the first SSB includes a primary synchronization signal, a secondary synchronization signal, and a first PBCH.

In an implementation, when the synchronization signal transmission mode is the second transmission mode, the first receiving unit is configured to receive a second SSB on the first carrier, where the second SSB includes a primary synchronization signal, a secondary synchronization signal, and a second PBCH.

In an implementation, the second PBCH includes at least one of the following information: a cell identifier, a beamforming identifier used by a synchronization signal, transmission power of the synchronization signal, resource allocation of grant-free uplink transmission, a carrier sensing mode used by the grant-free uplink transmission, and a power threshold used by the network device for performing carrier sensing.

In an implementation, when the synchronization signal transmission mode is the second transmission mode, the first receiving unit is configured to receive an SS on the first carrier, where the SS includes: a primary synchronization signal and a secondary synchronization signal.

In an implementation, a transmission resource corresponding to a first PBCH or a second PBCH on the first carrier is used to transmit a downlink data channel or a downlink control channel; or, the transmission resource corresponding to the first PBCH or the second PBCH on the first carrier is used to transmit a filling signal; or the transmission resource corresponding to the first PBCH or the second PBCH on the first carrier does not send information.

In an implementation, when a communication network where the network device is located is in a CA network deployment, then the synchronization signal transmission mode on the first carrier is the second transmission mode;

when the communication network where the network device is located is not in the CA network deployment, then the synchronization signal transmission mode on the first carrier is the first transmission mode.

In an implementation, a frequency domain resource on the first carrier is a frequency domain resource shared by at least two communication devices including the network device, and a frequency domain resources on the second carrier is a frequency domain resource dedicated to the network device.

In an implementation, the frequency domain resource on the first carrier is an unlicensed frequency domain resource, and the frequency domain resource on the second carrier is a licensed frequency domain resource.

A signal transmission apparatus provided by an embodiment of the present disclosure, is applied in a network device and the apparatus includes:

a determining unit, configured to determine a synchronization signal transmission mode on a first carrier, where the synchronization signal transmission mode is a first transmission mode or a second transmission mode; and a first sending unit, configured to send information to a terminal device on the first carrier according to the synchronization signal transmission mode.

In an implementation, the apparatus further includes:

a second sending unit, configured to send first indication information to the terminal device on a second carrier, where the first indication information is used to determine that the synchronization signal transmission mode on the first carrier is the first transmission mode or the second transmission mode.

In an implementation, when the synchronization signal transmission mode is the first transmission mode, the first sending unit is configured to send a first SSB on the first carrier, where the first SSB includes a primary synchronization signal, a secondary synchronization signal, and a first PBCH.

In an implementation, when the synchronization signal transmission mode is the second transmission mode, the first sending unit is configured to send a second SSB on the first carrier, where the second SSB includes a primary synchronization signal, a secondary synchronization signal, and a second PBCH.

In an implementation, the second PBCH includes at least one of the following information: a cell identifier, a beamforming identifier used by a synchronization signal, transmission power of the synchronization signal, resource allocation of grant-free uplink transmission, a carrier sensing mode used by the grant-free uplink transmission, and a power threshold used by the network device for performing carrier sensing.

In an implementation, when the synchronization signal transmission mode is the second transmission mode, the first sending unit is configured to send an SS on the first carrier, where the SS includes: a primary synchronization signal and a secondary synchronization signal.

In an implementation, a transmission resource corresponding to a first PBCH or a second PBCH on the first carrier is used to transmit a downlink data channel or a downlink control channel; or, the transmission resource corresponding to the first PBCH or the second PBCH on the first carrier is used to transmit a filling signal; or the transmission resource corresponding to the first PBCH or the second PBCH on the first carrier does not send information.

In an implementation, when a communication network where the network device is located is in a CA network deployment, then the determining unit determines that the synchronization signal transmission mode on the first carrier is the second transmission mode;

when the communication network where the network device is located is not in the CA network deployment, then the determining unit determines that the synchronization signal transmission mode on the first carrier is the first transmission mode.

In an implementation, a frequency domain resource on the first carrier is a frequency domain resource shared by at least two communication devices including the network device, and a frequency domain resource on the second carrier is a frequency domain resource dedicated to the network device.

In an implementation, the frequency domain resource on the first carrier is an unlicensed frequency domain resource, and the frequency domain resource on the second carrier is a licensed frequency domain resource.

A computer storage medium provided by an embodiment of the present disclosure has computer-executable instructions stored thereon, and the computer-executable instructions, when executed by a processor, implement the foregoing signal transmission methods.

In the technical solutions of the embodiments of the present disclosure, for a carrier in the unlicensed spectrum of the CA network deployment, since the network device does not need to send a PBCH to the terminal device for initial access, in this case, the network device can modify the content sent in the PBCH to assist the terminal device to perform data transmission; or, the network device may use a frequency domain resource used for PBCH transmission to transmit a data channel or a control channel, to improve resource utilization rate. In addition, the network device may send indication information to the terminal device through the carrier in the licensed spectrum, so that the terminal device served by the carrier in the unlicensed spectrum can correctly receive the synchronization signal.

BRIEF DESCRIPTION OF DRAWINGS

Drawings described here are used to provide a further understanding of the present disclosure and constitute a part of the present disclosure. The illustrative embodiments of the present disclosure and the descriptions thereof are used to explain the present disclosure, and do not constitute an improper limitation on the present disclosure. In the drawings:

FIG. 3 is a first schematic flowchart of a signal transmission method according to an embodiment of the present disclosure;

FIG. 4 is a second schematic flowchart of a signal transmission method according to an embodiment of the present disclosure;

FIG. 5 is a first schematic diagram of structure and composition of a signal transmission apparatus according to an embodiment of the present disclosure;

DESCRIPTION OF EMBODIMENTS

Figure 1:
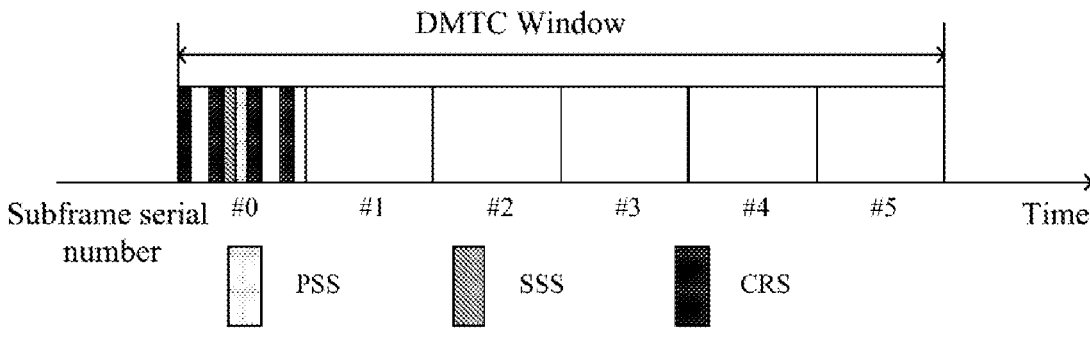
FIG. 1 is a schematic diagram of a time domain structure for sending a DRS in a DMTC window.

In order to facilitate understanding of the technical solutions of the embodiments of the present disclosure, related technologies involved in the embodiments of the present disclosure are described below.

1) Unlicensed Spectrum

An unlicensed spectrum is a spectrum that can be used for radio equipment communication divided by countries and regions. This spectrum is generally considered to be a shared spectrum, that is, communication devices of different communication systems can use this spectrum without applying for a proprietary spectrum license from the government as long as they meet regulatory requirements set by the countries or the regions on the spectrum. In order to allow various communication systems that use the unlicensed spectrum for performing wireless communication to coexist friendly on this spectrum, some countries or regions have stipulated regulatory requirements that must be met when using the unlicensed spectrum. For example, in Europe, a communication device follows the LBT principle, that is, a communication device needs to sense a channel on the unlicensed spectrum before transmitting a signal on the channel, and only when a channel sensing result is that the channel is idle, the communication device can perform signal transmission; if the channel sensing result of the communication device on the channel on the unlicensed spectrum is that the channel is busy, the communication device cannot perform signal transmission. And in order to ensure fairness, in a single transmission, a duration in which the communication device uses the channel of the unlicensed spectrum to perform signal transmission cannot exceed a maximum channel occupation time (MCOT). For another example, in order to avoid subband interference to signals transmitted on the channel of the unlicensed spectrum, and to improve the detection accuracy of the communication device when performing detection on the channel of the unlicensed spectrum, a signal transmitted on the channel of the unlicensed spectrum needs to occupy at least a certain percentage of bandwidth of the channel. For example, for a 5 GHz frequency band, the signals occupies 80% of the bandwidth of the channel, and for a 60 GHz frequency band, the signal occupies 70% of the bandwidth of the channel. For another example, in order to avoid the effect on the transmissions of other important signals, such as radar signals, on the channel caused by overlarge power of signals transmitted on the channel of the unlicensed spectrum, the regulations stipulate a maximum power spectrum density when the communication device performs signal transmission using the channel of the unlicensed spectrum.

2) Network Architecture

The embodiments of the present disclosure can be applied to various communication systems, for example, a global system of mobile communication (GSM) system, a code division multiple access (CDMA) system, a wideband code division multiple access (WCDMA) system, a general packet radio service (GPRS) system, a universal mobile telecommunication system (UMTS), an LTE system and an evolution system of LTE system, such as an advanced long term evolution (LTE-A) system, an NR system and an evolution system of NR system, such as an NR-based access to Unlicensed spectrum (NR-U) system, or a next-generation communication system or the like.

The embodiments of the present disclosure may also be applied to device-to-device (D2D) communication, machine-to-machine (M2M) communication, machine type communication (MTC), and vehicle-to-vehicle (V2V) communication.

The communication system in the embodiments of the present disclosure may be applied to a licensed spectrum, where the licensed spectrum is a spectrum dedicated to a network device. The communication system in the embodiments of the present disclosure may also be applied to an unlicensed spectrum, where the unlicensed spectrum is a spectrum shared by at least two communication devices, for example, a spectrum of 2.4 GHz, 5 GHz, 37 GHz, or 60 GHz.

The communication system in the embodiments of the present disclosure may be applied to a CA network deployment scenario, a DC network deployment scenario, or an SA network deployment scenario.

When the communication system in the embodiment of the present disclosure is applied to the unlicensed spectrum and the network deployment scenario is CA, the CA network deployment scenario may be that a primary carrier is on the licensed spectrum, a secondary carrier is on the unlicensed spectrum, and the primary carrier and the secondary carrier are connected through an ideal backhaul.

When the communication system in the embodiment of the present disclosure is applied to the unlicensed spectrum and the network deployment scenario is DC, the DC network deployment scenario may be that the primary carrier is in the licensed spectrum, the secondary carrier is in the unlicensed spectrum, and the primary carrier and the secondary carrier are connected through a non-ideal backhaul, where a system on the primary carrier and a system on the secondary carrier may belong to different systems, for example, the system on the primary carrier is an LTE system, while the system on the secondary carrier is an NR system, or the system on the primary carrier and the system on the secondary carrier may also belong to the same system, for example, the systems on the primary carrier and the secondary carrier are both LTE systems or NR systems.

When the communication system in the embodiment of the present disclosure is applied to the unlicensed spectrum and the network deployment scenario is SA, a terminal device may access a network through the system in the unlicensed spectrum.

The embodiments of the present disclosure describe various embodiments in combination with a network device and a terminal device, where:

the terminal device may also be referred to as a user equipment (UE), an access terminal, a user unit, a user station, a mobile station, a mobile platform, a remote station, a remote terminal, a mobile device, a user terminal, a terminal, a wireless communication device, a user agent or a user device. The terminal device may be a station (ST) in a wireless local area network (WLAN), may be a cellular phone, a cordless phone, a session initiation protocol (SIP) phone, a wireless local loop (WLL) station, a personal digital assistant (PDA) device, a handheld device with wireless communication capability, a computing device or other processing devices connected to wireless modems, an in-vehicle device, a wearable device, and a terminal device in a next-generation communication system, for example, a fifth-generation (5G) network, or a terminal device in a future evolved public land mobile network (PLMN) and the like. In the embodiments of the present disclosure, the terminal device may also be a wearable device. The wearable device may also be referred to as a wearable intelligent device, which is a general name of wearable devices developed by performing intelligently design on daily wear by applying wearable technology, such as glasses, gloves, watches, clothing and shoes.

The network device may be a device configured to communicate with a mobile device. The network device may be an access point (AP) in a WLAN, a base station (BTS, Base Transceiver Station) in GSM or CDMA, or a base station (NB, NodeB) in WCDMA, may also be an evolved base station (eNB or eNodeB, Evolutional Node B) in LTE, or a relay station or an access point, or an in-vehicle device, a wearable device, and a network device in an NR network or a network device in a future evolved PLMN network, or the like.

In the embodiments of the present disclosure, the network device provides services for a cell, and the terminal device communicates with the network device through transmission resources (for example, frequency domain resources or spectrum resources) used by the cell, and the cell may be a cell corresponding to the network device (for example, a base station). The cell may belong to a macro base station, or may belong to a base station corresponding to a small cell. The small cell here may include: a metro cell, a micro cell, a pico cell, a femto cell, or the like. These small cells are featured with small coverage area and low transmit power, and are suitable for providing a high-rate data transmission service.

In the embodiments of the present disclosure, there may be multiple cells on carriers in the LTE system or the NR system, which are operating on a same frequency at a same time. In some special scenarios, the above concepts of carrier and cell may also be considered equivalent. For example, in a CA scenario, when a secondary carrier is configured for a UE, a carrier index of the secondary carrier and a cell identifier (Cell ID) of a secondary cell operating on the secondary carrier are carried simultaneously. In this case, it can be considered that the concepts of carrier and cell are equivalent. For example, a UE accessing a carrier and accessing a cell are equivalent.

The embodiments of the present disclosure may be applied to an uplink or downlink physical channel or reference signal. For example, the physical channel may include a PDCCH, a PDSCH, a physical hybrid automatic repeat reQuest (HARD) indicator channel (PHICH), a PBCH, a physical multicast channel (PMCH), a physical random access channel (PRACH), a physical uplink control channel (PUCCH), a physical uplink shared channel (PUSCH), or the like, the reference signal may include a demodulation reference signal (DMRS), a sounding reference signal (SRS), a CSI-RS, a phase tracking reference signal (PT-RS), or the like.

When the NR technology is applied to the unlicensed spectrum, there may be multiple ways to deploy the network, such as CA, DC, or SA. Different network deployment manners have different requirements on the terminal device to access a cell in the unlicensed spectrum. Analysis is provided for these scenarios in the following:

Scenario 1: CA manner, that is, an NR carrier in a licensed spectrum is a primary carrier, an NR carrier in an unlicensed spectrum is a secondary carrier, the primary carrier and the secondary carrier are connected through an ideal backhaul, and a subcarrier spacing supported by the secondary carrier on the unlicensed spectrum is not greater than a predefined subcarrier spacing, for example, the subcarrier spacing supported by the secondary carrier on the unlicensed spectrum is not greater than 120 kHz.

In this scenario, the network device sends information such as a synchronization signal, a MIB, a secondary information block (SIB) on the primary carrier (the licensed spectrum), the terminal device can access a network by receiving the information such as the synchronization signal, the MIB, the SIB sent on the primary carrier, and then perform data transmission on the secondary carrier according to configuration information on the primary carrier. Correspondingly, on the secondary carrier, the network device needs to send reference signals such as a PSS and an SSS, so that the terminal device can accomplish an RRM measurement on the secondary carrier, thereby accomplishing a secondary cell management.

Scenario 2: CA manner, that is, an NR carrier in a licensed spectrum is a primary carrier, an NR carrier in an unlicensed spectrum is a secondary carrier, the primary carrier and the secondary carrier are connected through an ideal backhaul, and a subcarrier spacing supported by the secondary carrier on the unlicensed spectrum is not less than a predefined subcarrier spacing, for example, the subcarrier spacing supported by the secondary carrier on the unlicensed spectrum is not less than 240 kHz.

Scenario 3: heterogeneous system DC mode, that is, an LTE carrier in a licensed spectrum is a primary carrier, an NR carrier in an unlicensed spectrum is a secondary carrier, and the primary carrier and the secondary carrier are connected through a non-ideal backhaul.

Scenario 4: homogeneous system DC mode, that is, an NR carrier in a licensed spectrum is a primary carrier, an NR carrier in an unlicensed spectrum is a secondary carrier, and the primary carrier and the secondary carrier are connected through a non-ideal backhaul.

In scenarios 2, 3, and 4, a network device sends information such as a synchronization signal, a MIB, a SIB on the primary carrier, a terminal device can access a network by receiving the information such as the synchronization signal, the MIB, the SIB sent on the primary carrier. However, the terminal device cannot correctly determine subframe information on the secondary carrier according to time synchronization information obtained on the primary carrier (for scenario 2, it is due to that the subcarrier spacing on the secondary carrier is too large and the corresponding symbol is too short; for scenario 3 and scenario 4, it is due to that the primary carrier is not co-sited with the secondary carrier), and therefore, the synchronization signal and the PBCH need to be sent on the secondary carrier on the licensed spectrum, so that the terminal device can obtain time synchronization on the secondary carrier correctly.

Scenario 5: SA mode, that is, an NR carrier in an unlicensed spectrum is a primary carrier. In this scenario, the network device needs to send information such as a synchronization signal, a MIB, a SIB, on the primary carrier in the licensed spectrum, so that the terminal device can access the network by receiving the information such as the synchronization signal, the MIB, the SIB sent on the primary carrier.

Figure 2:
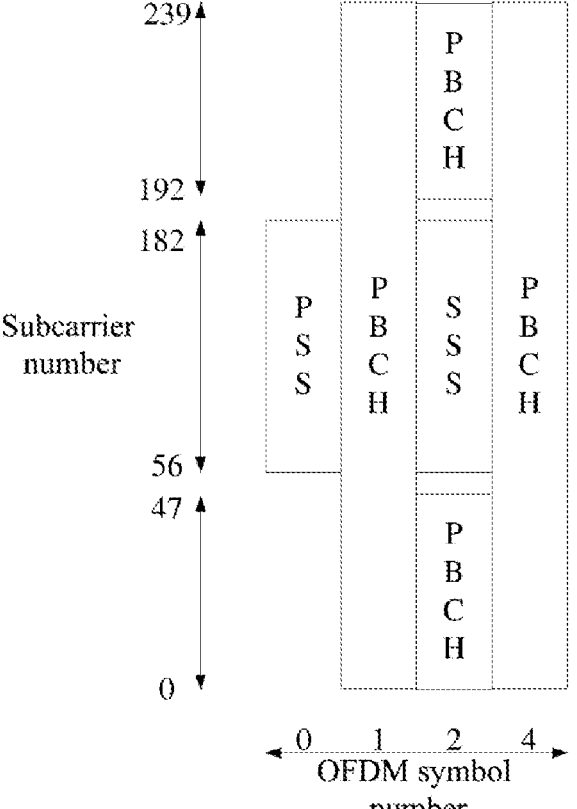
FIG. 2 is a schematic diagram of time-frequency resources of an SSB.

Therefore, in the above five scenarios, the synchronization signal and the PBCH need to be sent on the NR carrier in the unlicensed spectrum for scenarios 2, 3, 4, and 5, except for scenario 1, where only the synchronization signal for RRM measurement needs to be sent. It should be understood that the synchronization signal includes a PSS and an SSS, and the synchronization signal and the PBCH form the SSB, as shown in FIG. 2.

The technical solution of the embodiments of the present disclosure aims to solve a problem of how to send a synchronization signal, which is similar to DRS, in an NR-U system, so that the synchronization signal can meet the measurement/synchronization requirement of a user served by the NR-U system. The technical solutions of the embodiments of the present disclosure are described below.

FIG. 3 is a schematic flowchart of a signal transmission method according to an embodiment of the present disclosure. In the embodiment of the present disclosure, as shown in FIG. 3, the signal transmission method includes the following steps:

step 301: a terminal device determines a synchronization signal transmission mode on a first carrier, where the synchronization signal transmission mode is a first transmission mode or a second transmission mode.

In the embodiment of the present disclosure, the terminal device may determine the synchronization signal transmission mode on the first carrier based on the following manners.

Manner 1: the terminal device receives first indication information sent by a network device on a second carrier, where the first indication information is used to determine that the synchronization signal transmission mode on the first carrier is the first transmission mode or the second transmission mode; and the terminal device determines the synchronization signal transmission mode on the first carrier according to the first indication information.

Here, a frequency domain resource on the first carrier is a frequency domain resource shared by at least two communication devices including the network device, and a frequency domain resource on the second carrier is a frequency domain resource dedicated to the network device. In other words, the first carrier is referred to as a carrier in an unlicensed spectrum, and the second carrier is a carrier in a licensed spectrum. It should be understood that the first carrier includes at least one carrier in the unlicensed spectrum, and the second carrier includes at least one carrier in the licensed spectrum.

For example, the network device indicates the first indication information through one bit on the second carrier. The bit of "1" represents that the synchronization signal transmission mode is the first transmission mode, and the bit of "0" represents that the synchronization signal transmission mode is the second transmission mode. Of course, it may also be that, the bit of "0" represents that the synchronization signal transmission mode is the first transmission mode, and the bit of "1" represents that the synchronization signal transmission mode is the second transmission mode.

Manner 2: if the terminal device has not received the first indication information sent by the network device on the second carrier, then the terminal device determines that the synchronization signal transmission mode on the first carrier is the first transmission mode. If the terminal device has received the first indication information sent by the network device on the second carrier, then the terminal device determines that the synchronization signal transmission mode on the first carrier is the second transmission mode.

Here, the specific content of the first indication information may not be considered, and it is considered that the synchronization signal transmission mode is the second transmission mode as long as the terminal device has received the first indication information on the second carrier (or a parameter corresponding to the first indication information is configured). If the terminal device has not received the first indication information on the second carrier (or the parameter corresponding to the first indication information is not configured), then it is considered that the synchronization signal transmission mode is the first transmission mode.

Manner 3: in combination with the above manner 1 and the manner 2, if the terminal device has not received the first indication information sent by the network device on the second carrier, then the terminal device determines that the synchronization signal transmission mode on the first carrier is the first transmission mode. If the terminal device has received the first indication information sent by the network device on the second carrier, then the terminal device determines the synchronization signal transmission mode on the first carrier according to the first indication information, which may be the first transmission mode, and may also be the second transmission mode.

Manner 4: if the terminal device is not configured with the second carrier, or, the terminal device accesses a network through the first carrier, then the terminal device determines that the synchronization signal transmission mode on the first carrier is the first transmission mode.

Step 302: the terminal device receives information on the first carrier according to the synchronization signal transmission mode.

1) the Synchronization Signal Transmission Mode is the First Transmission Mode

The terminal device receives a first SSB on the first carrier, where the first SSB includes a primary synchronization signal, a secondary synchronization signal, and a first PBCH.

In an embodiment, the first PBCH includes MIB information for initial access of the terminal device.

In an embodiment, the first PBCH includes information that assists the terminal device to perform data transmission on the first carrier, for example, information such as transmission power of a synchronization signal.

2) The Synchronization Signal Transmission Mode is the Second Transmission Mode 2.1) A First Implementation of the Second Transmission Mode:

The terminal device receives a second SSB on the first carrier, and the second SSB includes: a primary synchronization signal, a secondary synchronization signal, and a second PBCH.

Here, there is at least one piece of different information between the information transmitted by the second PBCH and the information transmitted by the first PBCH. For example: the second PBCH includes at least one of the following information: a cell identifier, a beamforming identifier used by a synchronization signal, transmission power of the synchronization signal, resource allocation of grant-free uplink transmission, a carrier sensing mode used by the grant-free uplink transmission, and a power threshold used by the network device for performing carrier sensing.

In an embodiment, the transmission power of the synchronization signal may be used for the terminal device to measure a path loss of a downlink channel or quality information of the downlink channel.

In an embodiment, resource allocation of grant-free uplink transmission is semi-statically configured time-frequency resource.

In an embodiment, the carrier sensing mode used by the grant-free uplink transmission includes uplink channel access procedures in an LAA system, such as Type 1 or Type 2 channel access.

It should be understood that the second PBCH may include MIB information for initial access of the terminal device, or may not include MIB information for the initial access of the terminal device, which is not limited in the present disclosure.

2.2) A Second Implementation of the Second Transmission Mode:

The terminal device receives an SS on the first carrier, and the SS includes: a primary synchronization signal and a secondary synchronization signal.

Here, the PBCH (for example, the first PBCH or the second PBCH) does not need to be sent on the first carrier, and a transmission resource (for example, a time frequency resource occupied by the PBCH in FIG. 2) corresponding to the PBCH transmits other information, such as a downlink data channel or a downlink control channel. Of course, a filling signal may also be transmitted, or any information is not sent.

In an embodiment, the manner in which the network device uses the above transmission resource corresponding to the PBCH on the first carrier may be predefined, or specified by a communication standard, or signaled to the terminal device. If the transmission resource corresponding to the PBCH is used to transmit the downlink data channel or the downlink control channel, the terminal device receives information on the transmission resource corresponding to the PBCH. If the transmission resource corresponding to the PBCH is used to transmit the filling signal, or does not send any information, then the terminal device does not receive information on the transmission resource corresponding to the PBCH.

In the above solution, in an embodiment, a communication network where the terminal device is located is in a CA network deployment, and then the synchronization signal transmission mode on the first carrier is the second transmission mode; the communication network where the terminal device is located is not in the CA network deployment, and then the synchronization signal transmission mode on the first carrier is the first transmission mode.

In an embodiment, the synchronization signal transmission mode combined with the foregoing five types of network deployment scenarios may be described as follows:

Scenario 1: if the communication network where the terminal device and the network device are located is in a CA network deployment, and a subcarrier spacing supported by the first carrier is less than or equal to a first frequency bandwidth (e.g. 120 kHz), then the synchronization signal transmission mode on the first carrier is the second transmission mode.

Scenario 2: if the communication network where the terminal device and the network device are located is in the CA network deployment, and the subcarrier spacing supported by the first carrier is greater than or equal to a second frequency bandwidth (e.g. 240 kHz), then the synchronization signal transmission mode on the first carrier is the first transmission mode.

Scenario 3 and scenario 4: if the communication network where the terminal device and the network device are located is in a DC network deployment (a heterogeneous system DC mode or a homogeneous system DC mode), then the synchronization signal transmission mode on the first carrier is the first transmission mode.

Scenario 5: if the communication network where the terminal device and the network device are located is in an SA network deployment, then the synchronization signal transmission mode on the first carrier is the first transmission mode.

FIG. 4 is a second schematic flowchart of a signal transmission method according to an embodiment of the present disclosure, and in the embodiment of the present disclosure, as shown in FIG. 4, the signal transmission method includes the following steps:

Step 401: a network device determines a synchronization signal transmission mode on a first carrier, and the synchronization signal transmission mode is a first transmission mode or a second transmission mode.

In the embodiment of the present disclosure, in an embodiment, if a communication network where the network device is located is in a CA network deployment, then the network device determines that the synchronization signal transmission mode on the first carrier is the second transmission mode; if the communication network where the network device is located is not in the CA network deployment, then the network device determines that the synchronization signal transmission mode on the first carrier is the first transmission mode.

In an embodiment, the synchronization signal transmission mode determined by the network device with reference to the foregoing five types of network deployment scenarios may be described as follows:

Scenario 1: if a communication network where a terminal device and the network device are located is in a CA network deployment, and a subcarrier spacing supported by the first carrier is less than or equal to a first frequency bandwidth (e.g. 120 kHz), then it is determined that the synchronization signal transmission mode on the first carrier is the second transmission mode.

Scenario 2: if the communication network where the terminal device and the network device are located is in the CA network deployment, and the subcarrier spacing supported by the first carrier is greater than or equal to a second frequency bandwidth (e.g. 240 kHz), then it is determined that the synchronization signal transmission mode on the first carrier is the first transmission mode.

Scenario 3 and scenario 4: if the communication network where the terminal device and the network device are located is in a DC network deployment (a heterogeneous system DC mode or a homogeneous system DC mode), then it is determined that the synchronization signal transmission mode on the first carrier is the first transmission mode.

Scenario 5: if the communication network where the terminal device and the network device are located is in an SA network deployment, then it is determined that the synchronization signal transmission mode on the first carrier is the first transmission mode.

In the embodiment of the present disclosure, in order to let the terminal device know the synchronization signal transmission mode on the first carrier, the network device may send first indication information to the terminal device on a second carrier, and the first indication information is used to determine that the synchronization signal transmission mode on the first carrier is the first transmission mode or the second transmission mode.

Here, a frequency domain resource on the first carrier is a frequency domain resource shared by at least two communication devices including the network device, and a frequency domain resource on the second carrier is a frequency domain resource dedicated to the network device. In other words, the first carrier is referred to as a carrier in an unlicensed spectrum, and the second carrier is a carrier in a licensed spectrum.

For example, the network device indicates the first indication information by one bit on the second carrier. The bit of "1" represents that the synchronization signal transmission mode is the first transmission mode, and the bit of "0" represents that the synchronization signal transmission mode is the second transmission mode. Of course, it can also be that, the bit of "0" represents that the synchronization signal transmission mode is the first transmission mode, and the bit of "1" represents that the synchronization signal transmission mode is the second transmission mode.

Of course, the network device may not send the first indication information to the terminal device, but let the terminal device know the synchronization signal transmission mode on the first carrier in an implicit manner. For example: the network device does not send the first indication information, which indicates that the synchronization signal transmission mode is the first transmission mode; the network device sends the first indication information, which indicates that the synchronization signal transmission mode is the second transmission mode, or the network device sends the first indication information to allow the terminal device to determine whether the synchronization signal transmission mode is the first transmission mode or the second transmission mode according to the first indication information.

Step 402: the network device sends information to the terminal device on the first carrier according to the synchronization signal transmission mode.

1) The Synchronization Signal Transmission Mode is the First Transmission Mode

The network device sends a first SSB on the first carrier, where the first SSB includes a primary synchronization signal, a secondary synchronization signal, and a first PBCH.

In an embodiment, the first PBCH includes MIB information for initial access of the terminal device.

In an embodiment, the first PBCH includes information that assists the terminal device to perform data transmission on the first carrier, for example, information such as transmission power of a synchronization signal.

2) The Synchronization Signal Transmission Method is the Second Transmission Method 2.1) The Network Device Sends a Second SSB on the First Carrier, where the Second SSB Includes a Primary Synchronization Signal, a Secondary Synchronization Signal, and a Second PBCH.

Here, there is at least one piece of different information between the information transmitted by the second PBCH and the information transmitted by the first PBCH. For example: the second PBCH includes at least one of the following information: a cell identifier, a beamforming identifier used by a synchronization signal, transmission power of the synchronization signal, resource allocation of grant-free uplink transmission, a carrier sensing mode used by the grant-free uplink transmission, and a power threshold used by the network device for performing carrier sensing.

It should be understood that the second PBCH may include the MIB information for initial access of the terminal device, or may not include the MIB information for the initial access of the terminal device, which is not limited in the present disclosure.

2.2) The Network Device Sends an SS on the First Carrier, where the SS Includes: a Primary Synchronization Signal and a Secondary Synchronization Signal.

A transmission resource corresponding to the first PBCH or the second PBCH on the first carrier is used to transmit a downlink data channel or a downlink control channel; or, the transmission resource corresponding to the first PBCH or the second PBCH on the first carrier is used to transmit a filling signal; or, the transmission resource corresponding to the first PBCH or the second PBCH on the first carrier does not send information.

The technical solutions of the embodiments of the present disclosure are described below again in combination with specific examples.

First Application Example

An SSB is sent on an NR carrier in an unlicensed spectrum. In the above scenario 1, information sent in a PBCH is not only useless for data transmission of a terminal device, but also occupy a spectrum resource that could be used for data channel or control channel transmission. In this case, the content sent in the PBCH is modified, for example: some information that can assist the terminal device to perform data transmission in this scenario is sent in the PBCH, so as to avoid wasting resource. Alternatively, a filling signal is sent on the channel resource occupied by the PBCH to avoid misunderstanding of the system by the terminal device that should not receive the PBCH information.

The information that assists the terminal device to perform data transmission may be at least one of a cell identifier, a beamforming identifier used by a synchronization signal, transmission power of the synchronization signal, resource allocation of grant-free uplink transmission, a carrier sensing mode used by the grant-free uplink transmission, or a power threshold used by the network device for performing carrier sensing.

It should be understood that since the content sent in the PBCH is different under different scenarios, for example, in scenario 1, PBCH1 (that is, the second PBCH) is sent, and in scenarios 2, 3, 4, and 5, PBCH2 (that is, the first PBCH) is sent. For the terminal device, it is necessary to determine whether the currently received PBCH is analyzed according to PBCH1 or PBCH2, so as to receive the PBCH correctly. Since PBCH1 only occurs in scenario 1, and in the scenario 1, the terminal device accesses a network through a primary carrier in a licensed spectrum, signaling (i.e. the first indication information) can be sent to the terminal device through the primary carrier in the licensed spectrum to inform the terminal device about whether PBCH1 or PBCH2 is sent on a secondary carrier in an unlicensed spectrum. From a perspective of the terminal device, the terminal device may consider by default that PBCH2 is sent by the network device on the secondary carrier in the unlicensed spectrum; only when the terminal device receives the signaling on the licensed spectrum to confirm that PBCH1 is sent on the secondary carrier, the terminal device receives according to PBCH1.

In an embodiment, the network device sends one bit of bitmap signaling to the terminal device through the primary carrier in the licensed spectrum, and informs the terminal device about whether PBCH1 or PBCH2 is sent on the secondary carrier in the unlicensed spectrum through the bitmap signaling. In an embodiment, if PBCH1 is sent on the secondary carrier in the unlicensed spectrum, the network device configures a relevant parameter of PBCH1 on the secondary carrier in the unlicensed spectrum for the terminal device through the primary carrier in the licensed spectrum, if PBCH2 is sent on the secondary carrier in the unlicensed spectrum, then the network device does not configure the relevant parameter of the PBCH1 for the terminal device.

Second Application Example

In the above scenarios 2, 3, 4, and 5, an SSB is sent on an NR carrier in an unlicensed spectrum, while in scenario 1, only an SS is sent on the NR carrier in the unlicensed spectrum, and a PBCH is not sent. In scenario 1, since no information related to the PBCH is sent, in order to avoid wasting resources, a spectrum resource used for PBCH transmission may be used for data channel or control channel transmission.

It should be understood that since signals used for synchronization are different under different scenarios, for example, in scenario 1, the SS is sent, and in scenarios 2, 3, 4, and 5, the SSB is sent, then for the terminal device, it is necessary to determine whether the network device sends the SS or the SSB, thereby accomplishing a correct rate matching. Since the SS only occurs in scenario 1, and in the scenario 1, the terminal device accesses a network through a primary carrier in a licensed spectrum, signaling (that is, the first indication information) can be sent to the terminal device through the primary carrier in the licensed spectrum to inform the terminal device about whether the SS or the SSB is sent on a secondary carrier in the unlicensed spectrum. From a perspective of the terminal device, the terminal device may consider by default that the network device sends the SSB on the secondary carrier in the unlicensed spectrum; only when the terminal device is in a CA scenario and receives the signaling in the licensed spectrum to confirm that the SS is sent on the secondary carrier, the terminal receives the SS only.

In an embodiment, the network device sends one bit of bitmap signaling to the terminal device through the primary carrier in the licensed spectrum, and informs the terminal device about whether the SS or the SSB is sent on the secondary carrier in the unlicensed spectrum through the bitmap signaling. In an embodiment, if the SS is sent on the secondary carrier in the unlicensed spectrum, the network device configures a parameter for the terminal device through the primary carrier in the licensed spectrum, which indicates that only the SS is sent on the secondary carrier in the unlicensed spectrum; if the SSB is sent on the secondary carrier in the unlicensed spectrum, then the network device does not configure the parameter for the terminal device.

FIG. 5 is a first schematic diagram of structure and composition of a signal transmission apparatus according to an embodiment of the present disclosure. The signal transmission apparatus of this embodiment is applied to a terminal device, and the apparatus includes:

a determining unit 501, configured to determine a synchronization signal transmission mode on a first carrier, where the synchronization signal transmission mode is a first transmission mode or a second transmission mode; and a first receiving unit 502, configured to receive information on the first carrier according to the synchronization signal transmission mode.

In an implementation, the apparatus further includes:

a second receiving unit 503, configured to receive first indication information sent by a network device on a second carrier, and the first indication information is used to determine that the synchronization signal transmission mode on the first carrier is the first transmission mode or the second transmission mode; and the determining unit 501 is configured to determine the synchronization signal transmission mode on the first carrier according to the first indication information.

In an implementation, when the second receiving unit 503 has not received the first indication information sent by the network device on the second carrier, the determining unit

501 is configured to determine the synchronization signal transmission mode on the first carrier is the first transmission mode.

In an implementation, the synchronization signal transmission mode is the first transmission mode, and correspondingly, the first receiving unit 502 is configured to receive a first SSB on the first carrier, where the first SSB includes a primary synchronization signal, a secondary synchronization signal, and a first PBCH.

In an implementation, the synchronization signal transmission mode is the second transmission mode, and correspondingly, the first receiving unit 502 is configured to receive a second SSB on the first carrier, where the second SSB includes a primary synchronization signal, a secondary synchronization signal, and a second PBCH.

In an implementation, the second PBCH includes at least one of the following information: a cell identifier, a beamforming identifier used by a synchronization signal, transmission power of the synchronization signal, resource allocation of grant-free uplink transmission, a carrier sensing mode used by the grant-free uplink transmission, and a power threshold used by the network device for performing carrier sensing.

In an implementation, the synchronization signal transmission mode is the second transmission mode, and correspondingly, the first receiving unit 502 is configured to receive an SS on the first carrier, where the SS includes: a primary synchronization signal and a secondary synchronization signal.

In an implementation, a transmission resource corresponding to the first PBCH or the second PBCH on the first carrier is used to transmit a downlink data channel or a downlink control channel; or, the transmission resource corresponding to the first PBCH or the second PBCH on the first carrier is used to transmit a filling signal; or the transmission resource corresponding to the first PBCH or the second PBCH on the first carrier does not send information.

In an implementation, a communication network where the network device is located is in a carrier aggregation (CA) network deployment, and then the synchronization signal transmission mode on the first carrier is the second transmission mode;

the communication network where the network device is located is not in the CA network deployment, and then the synchronization signal transmission mode on the first carrier is the first transmission mode.

In an implementation, a frequency domain resource on the first carrier is a frequency domain resource shared by at least two communication devices including the network device, and a frequency domain resource on the second carrier is a frequency domain resource dedicated to the network device.

Those skilled in the art should understand that implementation functions of units in the signal transmission apparatus shown in FIG. 5 can be understood by referring to related descriptions of the foregoing signal transmission methods. The functions of the units in the signal transmission apparatus shown in FIG. 5 may be implemented by a program running on a processor, or may be implemented through a specific logic circuit.

Figure 6:
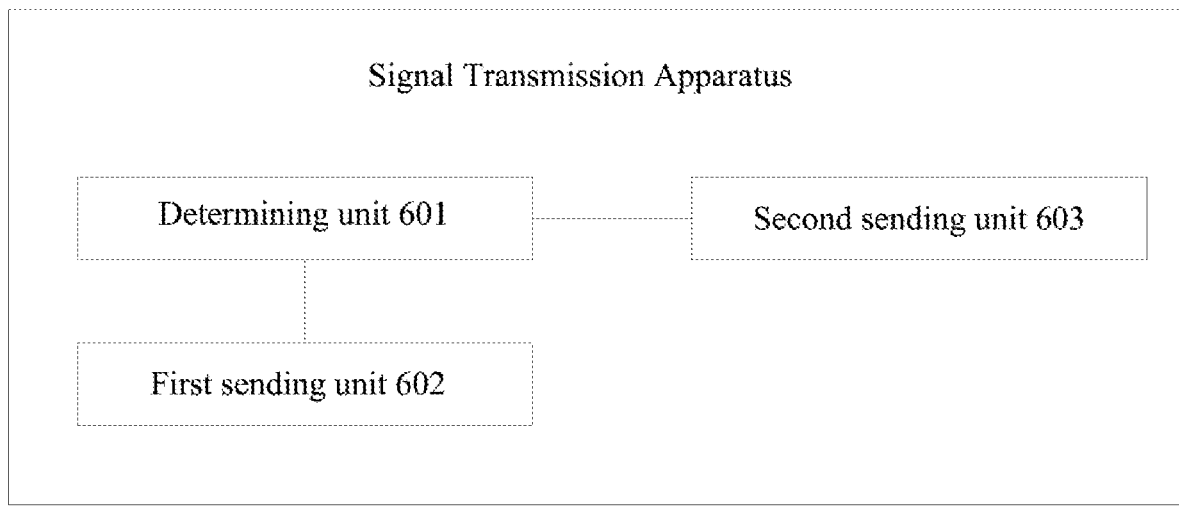
FIG. 6 is a second schematic diagram of structure and composition of a signal transmission apparatus according to an embodiment of the present disclosure.

FIG. 6 is a second schematic diagram of structure and composition of a signal transmission apparatus according to an embodiment of the present disclosure. The signal transmission apparatus of this embodiment is applied to a network device, and the apparatus includes:

a determining unit 601, configured to determine a synchronization signal transmission mode on a first carrier, where the synchronization signal transmission mode is a first transmission mode or a second transmission mode; and a first sending unit 602, configured to send information to a terminal device on the first carrier according to the synchronization signal transmission mode.

In an implementation, the apparatus further includes:

a second sending unit 603, configured to send first indication information to the terminal device on a second carrier, where the first indication information is used to determine the synchronization signal transmission mode on the first carrier is the first transmission mode or the second transmission mode.

In an implementation, the synchronization signal transmission mode is the first transmission mode, and correspondingly, the first sending unit 602 is configured to send a first SSB on the first carrier, where the first SSB includes a primary synchronization signal, a secondary synchronization signal, and a first PBCH.

In an implementation, the synchronization signal transmission mode is the second transmission mode, and correspondingly, the first sending unit 602 is configured to send a second SSB on the first carrier, where the second SSB includes a primary synchronization signal, a secondary synchronization signal, and a second PBCH.

In an implementation, the second PBCH includes at least one of the following information: a cell identifier, a beamforming identifier used by a synchronization signal, transmission power of the synchronization signal, resource allocation of grant-free uplink transmission, a carrier sensing mode used by the grant-free uplink transmission, and a power threshold used by the network device for performing carrier sensing.

In an implementation, the synchronization signal transmission mode is the second transmission mode, and correspondingly, the first sending unit 602 is configured to send an SS on the first carrier, where the SS includes: a primary synchronization signal and a secondary synchronization signal.

In an implementation, a transmission resource corresponding to the first PBCH or the second PBCH on the first carrier is used to transmit a downlink data channel or a downlink control channel; or, the transmission resource corresponding to the first PBCH or the second PBCH on the first carrier is used to transmit a filling signal; or the transmission resource corresponding to the first PBCH or the second PBCH on the first carrier does not send information.

In an implementation, a communication network where the network device is located is in a CA network deployment, and then the determining unit determines that the synchronization signal transmission mode on the first carrier is the second transmission mode;

the communication network where the network device is located is not in the CA network deployment, and then the determining unit determines that the synchronization signal transmission mode on the first carrier is the first transmission mode.

In an implementation, a frequency domain resource on the first carrier is a frequency domain resource shared by at least two communication devices including the network device, and a frequency domain resource on the second carrier is a frequency domain resource dedicated to the network device.

Those skilled in the art should understand that implementation functions of units in the signal transmission apparatus shown in FIG. 6 can be understood by referring to related descriptions of the foregoing signal transmission methods. The functions of the units in the signal transmission apparatus shown in FIG. 6 may be implemented by a program running on a processor, or may be implemented by a specific logic circuit.

The above signal transmission apparatus of the embodiments of the present disclosure, if implemented as a software functional unit and sold or used as a standalone product, can be stored in a computer-readable storage medium. Based on such understanding, the technical solution of the present disclosure essentially, or a part contributing to the prior art, may be embodied in a form of a software product, the computer software product is stored in a storage medium and includes a number of instructions for causing a computer device (which may be a personal computer, a server, or a network device, or the like) to perform all or part of the methods according to various embodiments of the present disclosure. The foregoing storage medium includes various medium that can store program codes, such as a U disk, a mobile hard disk, a read-only memory (ROM), a magnetic disk, or an optical disk, or the like. In this way, the embodiments of the present disclosure are not limited to any specific combination of hardware and software.

Correspondingly, an embodiment of the present disclosure further provides a computer storage medium having computer-executable instructions stored thereon, where the computer-executable instructions, when executed by a processor, implement the foregoing signal transmission methods of the embodiments of the present disclosure.

Figure 7:
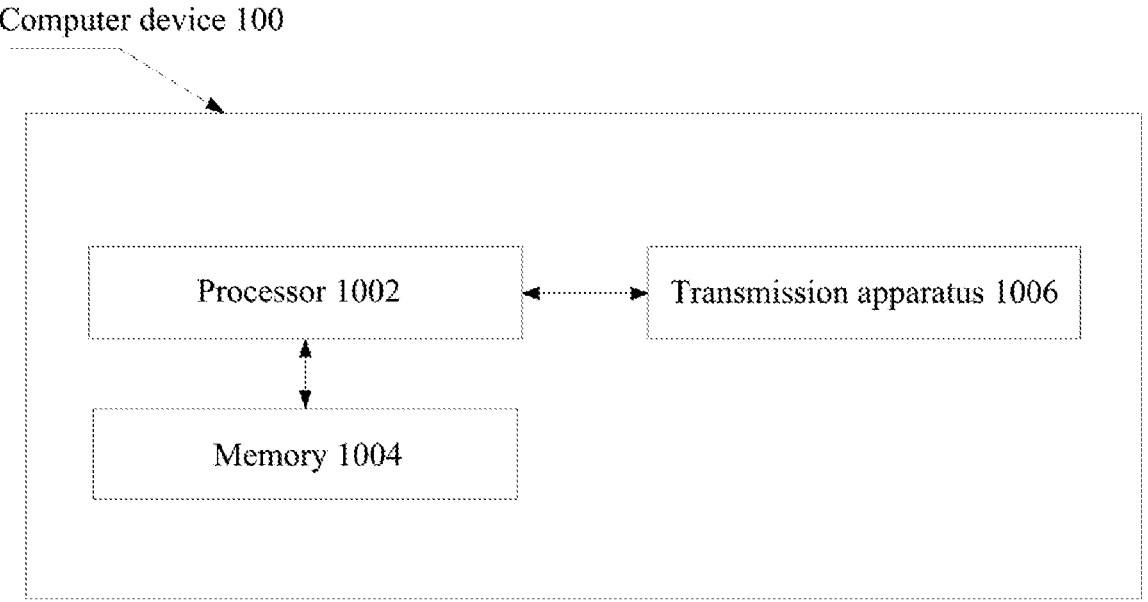
FIG. 7 is a schematic diagram of structure and composition of a computer device according to an embodiment of the present disclosure.

FIG. 7 is a schematic diagram of structure and composition of a computer device according to an embodiment of the present disclosure. The computer device may be a terminal device, and may also be a network device. As shown in FIG. 7, the computer device 100 may include one or more (only one shown in the figure) processor 1002 (the processor 1002 may include but is not limited to processing apparatus such as a microprocessor (MCU, Micro Controller Unit) or a programmable logic device (FPGA, Field Programmable Gate Array), a memory 1004 configured to store data, and a transmission apparatus 1006 for a communication function. A person of ordinary skill in the art can understand that the structure shown in FIG. 7 is only illustrative, which does not limit the structure of the above electronic device. For example, the computer device 100 may also include more or fewer components than those shown in FIG. 7, or have a different configuration from that shown in FIG. 7.

The memory 1004 may be configured to store software programs and modules of application software, such as program instructions/modules corresponding to the methods of the embodiments of the present disclosure. The processor 1002 executes various functional applications and data processing, that is, implements the methods described above, by running the software programs and modules stored in the memory 1004. The memory 1004 may include a high-speed random-access memory, and may also include a non-volatile memory, such as one or more magnetic storage apparatus, a flash memory, or other non-volatile solid-state memory. In some examples, the memory 1004 may further include memories remotely set with respect to the processor 1002, and these remote memories may be connected to the computer device 100 through a network. Examples of the above network include, but are not limited to, an internet, an intranet, a local area network, a mobile communication network, and combinations thereof.

The transmission apparatus 1006 is configured to receive or send data via a network. The specific examples of the above network may include a wireless network provided by a communication provider of the computer device 100. In an example, the transmission apparatus 1006 includes a network adapter (NIC, Network Interface Controller), which can be connected to other network devices through a base station so as to perform communication with an internet. In an example, the transmission apparatus 1006 may be a radio frequency (RF) module, which is configured to communicate with the internet in a wireless manner.

The technical solutions described in the embodiments of the present disclosure can be arbitrarily combined when there is no conflict.

In the several embodiments provided by the present disclosure, it should be understood that the disclosed methods and intelligent devices may be implemented in other ways. The device embodiments described above are only illustrative. For example, the division of the units is only a logical function division. In an actual implementation, there may be another division manner. For example, multiple units or components may be combined, or may be integrated into another system, or some features can be ignored or not executed. In addition, the shown or discussed coupling or direct coupling or communication connection between various components may be an indirect coupling or communication connection through some interfaces, devices or units, and may be in electrical, mechanical or in other forms.

The above units described as separate components may or may not be physically separated, and the components displayed as units may or may not be physical units, that is, may be located in one place, or may be distributed to multiple network units. Some or all of the units may be selected according to actual needs to implement the purpose of the solution of the present embodiment.

In addition, the functional units in the embodiments of the present disclosure may be integrated into processing unit, or each unit may be separately used as one unit, or two or more units may be integrated into one unit; the above integrated units may be implemented in a form of hardware, or implemented in a form of hardware plus software functional units.

The above mentioned are only specific implementations of the present disclosure, but the protection scope of the present disclosure is not limited thereto. Any person skilled in the art can easily think of changes or substitutions within the technical scope disclosed in the present disclosure, which should be covered in the protection scope of the present disclosure.

What is claimed is:

1. A signal transmission method, applied in a new radio (NR) system, which supports a carrier aggregation (CA) network deployment a dual connectivity (DC) network deployment, or a standalone (SA) network deployment, wherein the method comprises:

determining, by a terminal device, a synchronization signal transmission mode on a first carrier, which comprises:

when the terminal device has received first indication information sent by a network device on a second carrier, then determining, by the terminal device, the synchronization signal transmission mode on the first carrier according to the first indication information, which is a first transmission mode or a second transmission mode, wherein the first indication information is used to determine that the synchronization signal transmission mode on the first carrier is the first transmission mode or the second transmission mode; or when the terminal device is not configured with the second carrier, then determining, by the terminal device, that the synchronization signal transmission mode on the first carrier is the first transmission mode;

receiving, by the terminal device, information on the first carrier according to the synchronization signal transmission mode.

2. The method according to claim 1, wherein the determining, by a terminal device, a synchronization signal transmission mode on a first carrier, comprises:

determining, by the terminal device, that the synchronization signal transmission mode on the first carrier is the first transmission mode when the terminal device has not received first indication information sent by a network device on a second carrier.

3. The method according to claim 1, wherein;

when a communication network where the terminal device is located is in the CA network deployment, then the synchronization signal transmission mode on the first carrier is the second transmission mode;

when the communication network where the terminal device is located is not in the CA network deployment, then the synchronization signal transmission mode on the first carrier is the first transmission mode.

4. The method according to claim 1, wherein a frequency domain resource on the first carrier is a frequency domain resource shared by at least two communication devices including the network device, and a frequency domain resource on the second carrier is a frequency domain resource dedicated to the network device.

5. A signal transmission apparatus, applied in a terminal device, applied in a new radio (NR) system, which supports a carrier aggregation (CA) network deployment, a dual connectivity (DC) network deployment, or a standalone (SA) network deployment wherein the apparatus comprises: one or more processors, a memory, and a transmission apparatus, wherein the one or more processors are configured to execute programs stored in the memory to implement the following steps:

determining a synchronization signal transmission mode on a first carrier, which comprises:

when the transmission apparatus has received first indication information sent by a network device on a second carrier then determining the synchronization signal transmission mode on the first carrier according to the first indication information, which is a first transmission mode or a second transmission mode, wherein the first indication information is used to determine that the synchronization signal transmission mode on the first carrier is the first transmission mode or the second transmission mode; or when the transmission apparatus is not configured with the second carrier, then determining that the synchronization signal transmission mode on the first carrier is the first transmission mode;

receiving, through the transmission apparatus, information on the first carrier according to the synchronization signal transmission mode.

6. The apparatus according to claim 5, wherein, the one or more processors are further configured to execute the programs stored in the memory to implement the following steps:

determining that the synchronization signal transmission mode on the first carrier is the first transmission mode when having not received first indication information sent by a network device on a second carrier through the transmission apparatus.

7. The apparatus according to claim 5, wherein when the synchronization signal transmission mode is the first transmission mode, the one or more processors are further configured to execute the programs stored in the memory to implement the following step:

receiving, through the transmission apparatus, a first synchronization signal block (SSB) on the first carrier, wherein the first SSB comprises a primary synchronization signal, a secondary synchronization signal, and a first physical broadcast channel (PBCH).

8. The apparatus according to claim 5, wherein when the synchronization signal transmission mode is the second transmission mode, the one or more processors are further configured to execute the programs stored in the memory to implement the following step:

receiving, through the transmission apparatus, a second SSB on the first carrier, wherein the second SSB comprises a primary synchronization signal, a secondary synchronization signal, and a second PBCH.

9. The apparatus according to claim 8, wherein the second PBCH comprises at least one of the following information: a cell identifier, a beamforming identifier used by a synchronization signal, transmission power of the synchronization signal, resource allocation of grant-free uplink transmission, carrier sensing mode used by the grant-free uplink transmission, and a power threshold used by the network device for performing carrier sensing.

10. The apparatus according to claim 5, wherein when the synchronization signal transmission mode is the second transmission mode, the one or more processors are further configured to execute the programs stored in the memory to implement the following step:

receiving, through the transmission apparatus, a synchronization signal (SS) on the first carrier, wherein the SS comprises: a primary synchronization signal and a secondary synchronization signal.

11. The apparatus according to claim 10, wherein:

a transmission resource corresponding to a first PBCH or a second PBCH on the first carrier is used to transmit a downlink data channel or a downlink control channel; or the transmission resource corresponding to the first PBCH or the second PBCH on the first carrier is used to transmit a filling signal; or the transmission resource corresponding to the first PBCH or the second PBCH on the first carrier does not send information.

12. A signal transmission apparatus, applied in a network device, applied in a new radio (NR) system, which supports a carrier aggregation (CA) network deployment, a dual connectivity (DC) network deployment or a standalone (SA) network deployment, wherein the apparatus comprises: one or more processors, a memory, and a transmission apparatus, wherein the one or more processors are configured to execute programs stored in the memory to implement the following steps:

determining a synchronization signal transmission mode on a first carrier;

sending, through the transmission apparatus, first indication information to the terminal device on a second carrier, wherein the first indication information is used to determine that the synchronization signal transmission mode on the first carrier is the first transmission mode or the second transmission mode;

wherein the terminal device is configured to, when the terminal device has received first indication information sent by a network device on a second carrier determine that the synchronization signal transmission mode on the first carrier according to the first indication information is a first transmission mode or a second transmission mode; or the terminal device is configured to, when the terminal device is not configured with the second carrier, determine that the synchronization signal transmission mode on the first carrier is the first transmission mode;

sending, through the transmission apparatus, information to a terminal device on the first carrier according to the synchronization signal transmission mode.

13. The apparatus according to claim 12, wherein when the synchronization signal transmission mode is the first transmission mode, the one or more processors are further configured to execute the programs stored in the memory to implement the following step:

sending, through the transmission apparatus, a first synchronization signal block (SSB) on the first carrier, wherein the first SSB comprises a primary synchronization signal, a secondary synchronization signal, and a first physical broadcast channel (PBCH).

14. The apparatus according to claim 12, wherein when the synchronization signal transmission mode is the second transmission mode, the one or more processors are further configured to execute the programs stored in the memory to implement the following step:

sending, through the transmission apparatus, a second SSB on the first carrier, wherein the second SSB comprises a primary synchronization signal, a secondary synchronization signal, and a second PBCH;

wherein the second PBCH comprises at least one of the following information: a cell identifier, a beamforming identifier used by a synchronization signal, transmission power of the synchronization signal, resource allocation of grant-free uplink transmission, a carrier sensing mode used by the grant-free uplink transmission, and a power threshold used by the network device for performing carrier sensing.

15. The apparatus according to claim 12, wherein when the synchronization signal transmission mode is the second transmission mode, the one or more processors are further configured to execute the programs stored in the memory to implement the following step:

sending, through the transmission apparatus, a synchronization signal (SS) on the first carrier, wherein the SS comprises: a primary synchronization signal and a secondary synchronization signal;

wherein:

a transmission resource corresponding to a first PBCH or a second PBCH on the first carrier is used to transmit a downlink data channel or a downlink control channel; or the transmission resource corresponding to the first PBCH or the second PBCH on the first carrier is used to transmit a filling signal; or the transmission resources corresponding to the first PBCH or the second PBCH on the first carrier does not send information.

16. The apparatus according to claim 12, wherein:

when a communication network where the network device is located is in the CA network deployment, then the one or more processors are further configured to execute the programs stored in the memory to implement the following step:

determining that the synchronization signal transmission mode on the first carrier is the second transmission mode;

when the communication network where the network device is located is not in the CA network deployment, then the one or more processors are further configured to execute the programs stored in the memory to implement the following step:

determining that the synchronization signal transmission mode on the first carrier is the first transmission mode.

17. The apparatus according to claim 12, wherein a frequency domain resource on the first carrier is a frequency domain resource shared by at least two communication devices including the network device, and a frequency domain resource on the second carrier is a frequency domain resource dedicated to the network device.

* * * * *